United States Patent [19]

Wright

[11] 3,969,309

[45] July 13, 1976

[54] SILICONE CHANNEL SEALANT

[75] Inventor: John H. Wright, Elnora, N.Y.

[73] Assignee: General Electric Company, Waterford, N.Y.

[22] Filed: Apr. 30, 1975

[21] Appl. No.: 573,320

[52] U.S. Cl. .............................. 260/37 SB; 260/827
[51] Int. Cl.² ........................................ C08L 83/04
[58] Field of Search ....................... 260/37 SB, 2.5 S

*Primary Examiner*—Lewis T. Jacobs
*Attorney, Agent, or Firm*—Donald J. Voss; E. Philip Koltos; Frank L. Neuhauser

[57] ABSTRACT

A silicone channel sealant with improved solvent and water resistance comprising a diorganopolysiloxane of 50 to 200,000 centipoise viscosity and blends of diorganopolysiloxanes wherein powdered polytetrafluoroethylene, treated and untreated silica filler, a titanate of the formula $(RO)_4Ti$, where R is selected from alkyl radicals and haloalkyl radicals, and an organic compound containing at least one hydroxy group are present as a water resistance additive.

In addition to the above basic ingredients, there can be present in the composition of the present case a silicate, a boron compound, styrene beads, a polyether, and optionally as a corrosion resistant additive such as, zinc chromium salts or iron oxide.

The above channel sealant which is desirable as a channel sealant for fuel tanks of aircraft has the advantageous properties that it is both solvent resistant, water resistant, has good consistency and does not flow at low pressures but is easily injectable.

26 Claims, No Drawings

SILICONE CHANNEL SEALANT

BACKGROUND OF THE INVENTION

The present invention relates to silicone channel sealant and more particularly the present invention relates to silicone channel sealant for the fuel tank of aircraft where the sealant is both water resistant, solvent resistant and does not flow under low pressure, that is, pressures of less than 50 psi.

In various high performance vehicles and particularly aircraft, certain compartments such as the fuel tank are subject to temperature extremes and extreme pressures. This is particularly true for the fuel tanks of jet aircraft. Because of these temperature extremes and various pressures, it has been found that if such fuel tanks are welded together into an integrally sealed unit that the tank will rupture. Accordingly, it has been the practice to make such tanks such that movement is possible at the joints between the different sides, bottom, and top.

Accordingly, to seal such tanks it has been the practice to form closed channels where the particular sides meet and to insert into the channel through a grease fitting a sealant which fills the channel and thus seals the particular sides and edges of the fuel tank. Such a sealant must move under pressure so as to permit relative movement between the sides that are so sealed depending on the pressures and temperature changes that the different sides of the fuel tank may be exposed to. Such sealed fuel tanks have to be periodically reinjected with such sealant since such sealant through the passage of time may partially come out of the channels through small openings that may be present. In addition to being solvent resistant so as to resist the effects of the fuel that may be in the tank, such channel sealants have to be resistant to any water that may flow into the channel through condensation or other means. Also, the material must be flowable under pressure in order to be injected into the channel through a grease fitting, but it must not be so flowable such that it passes out of small openings in the channel and as a result cause a leak in the compartment or tank that is being sealed.

One example of such sealants were the polysulfides which materials are solvent resistant. On the other hand, such materials undergo a rapid change in properties during temperature changes.

The biggest disadvantage of such polysulfide channel sealants is that a very large pressure is needed to inject them into the channels and as a result damage to the channels and the compartment or tank often results.

Alternatives to such polysulfide channel sealants are those proposed in U.S. Pat. No. 3,755,380 and U.S. Pat. No. 3,580,870. Basically, these compositions have in them a fluorosilicone basic material which is solvent resistant and which could be injected into the channels of a tank under moderate pressures.

The disadvantages with such materials were that they would flow easily even under moderate pressures. The channel sealant after it has been inserted into the channel is exposed to moderate pressures such as, pressures of 20 to 50 psi by the vapors in the fuel tank or compartment. Accordingly, the disadvantage of such silicone channel sealants as those proposed in the above patents was that they would tend to flow out of the channel upon being exposed to the moderate pressures in the aircraft fuel tank.

A partial solution to this problem was that proposed in U.S. Pat. No. 3,580,870, above, which describes the use of beads in such channel sealants. This tended to solve some of the problems with respect to flowing. However, such channel sealants even with beads still tended to flow sideways out of openings in the channel and thus run out of the channel and result in leaks in the fuel tank or compartment.

Another problem with such sealants having beads in there, described in the above U.S. Pat. No. 3,580,870, was that they would still flow sideways in the channel out through openings as has been stated before and would flow out of any opening even at pressures as low as 10 to 20 psi. In addition, the materials with the beads in them required abnormally higher pressure to be injected.

An improved channel sealant was proposed by the applicant in U.S. Pat. No. 3,453,210, which basically describes a channel sealant composed of a diorganopolysiloxane, powdered teflon and silica, which material will flow only when reasonably high pressures over 100 psi were applied to it, but which material would still be injected into a channel through grease fittings under normal injection pressures and would not result in rupture of the channels. However, this material while an effective channel sealant and having the properties of non-flowability at the normal pressures which were to be found in the fuel tank and which material had an acceptable solvent resistance, nevertheless, had a tendency to be water sensitive. This channel sealant when exposed to certain quantities of moisture or water would tend to degrade and flow out of the channel.

Accordingly, it is one object of the present invention to provide a channel sealant which is both solvent resistant and water resistant.

It is another object of the present invention to provide a new and improved silicone channel sealant which will not flow upon being exposed to pressures of up to 50 psi and even to pressures up to 100 psi, but will flow at pressures of 2000 to 3000 psi.

It is an additional object of the present invention to provide a novel improved silicone channel sealant that will not flow sideways or will flow only slightly sideways in the channel in which it is injected.

It is yet another object of the present invention to provide a process for making a new improved silicone channel sealant which is non-flowable under normal pressures, that is, pressures less than 100 psi; is flowable at pressures above 1000 psi; does not flow sideways in the channel and which process is simple and efficient.

These and other objects of the present disclosure are accomplished by means of the invention set forth herein below.

SUMMARY OF THE INVENTION

There is provided by the present invention a silicone channel sealant comprising 100 parts by weight of a diorganopolysiloxane and blends of diorganopolysiloxanes of viscosities of 50 to 200,000 centipoise at 25°C, where the organo groups of such diorganopolysiloxanes are selected from monovalent hydrocarbon radicals and cyanoalkyl radicals, 10 to 150 parts by weight of polytetrafluoroethylene, 4 to 25 parts by weight of untreated silica, 4 to 25 parts of a treated silica, 0.3 to 2.0 parts by weight of a titanate of the formula, $(RO)_4Ti$                  (1)

where R is selected from alkyl radicals and haloalkyl radicals of 2 to 5 carbon atoms and from 0.3 to 2.0 parts by weight of an organic compound which is a water stabilizing additive where such organic compound contains at least one hydroxy group and from 10 to 50 parts by weight of styrene beads. There is also preferably in the present composition in the channel sealant from 0.5 to 10 parts of a boron compound to give the sealant high temperature stability; from 0.1 to 5 parts of a silicate or an orthosilicate to give the compound more consistency; from 5 to 40 parts of a diorganopolysiloxane of a gum or blends of gums having a viscosity of 1,000,000 to 200,000,000 centipoise at 25°C, where the organo groups in such gums are selected from alkyl and cyanoalkyl radicals and the gum is vinyl-terminated. Such gum is added to give the sealant non-flowability and consistency. There is also preferably a small amount of peroxide such as, 100 to 10,000 parts per million of peroxide in the sealant so as to partially cure the gum after it has been inserted into the sealant for consistency purposes. There may also be present as a stabilizer, 0.1 to 2 parts of a polyether and 0.1 to 8 parts of a corrosion resistant additive selected from iron oxide and zinc salts of chromium.

In accordance with the present invention, such a channel sealant is produced by first mixing the diorganopolysiloxane polymer of 50 to 200,000 centipoise viscosity at 25°C, the gum, the teflon, the two different silicas, the titanate, the hydroxy-containing organic compound, the silicate and the boron compound. After these ingredients are mixed, preferably in a dough-mixer, the resulting composition is heated to between 100° to 200°C for anywhere from 1 to 10 hours, preferably under a nitrogen atmosphere. At the end of that period in the same doughmixer, there is then mixed into the resulting mix devolatilized material, the beads, the polyether and the corrosion resistant additives. Although, as said herein below, there is a preferred step of mixing the ingredients which optimizes the properties of the resulting silicone channel sealant, it must be stated that within the different steps of the process the ingredients may be mixed as desired.

DESCRIPTION OF THE PREFERRED EMBODIMENT

The basic ingredient in the novel channel sealant of the present invention is a diorganopolysiloxane of 50 to 200,000 centipoise at 25°C, where the organo groups are selected from monovalent hydrocarbon radicals and cyanoalkyl radicals. The monovalent hydrocarbon radicals can be alkyl radicals such as, methylethyl and etc.; alkenyl radicals such as, vinyl, allyl and etc.; cycloalkyl radicals such as, cyclohexyl, cycloheptyl and etc.; and other radicals normally associated as substituent groups for linear diorganopolysiloxanes. Preferably, the monovalent hydrocarbon radicals are alkyl radicals of 1 to 8 carbon atoms. The cyanoalkyl radicals are preferably cyanoalkyl radicals of 2 to 5 carbon atoms. It is preferred in the total diorganopolysiloxane polymer that there be at least 25 mole percent cyanoalkyl radicals to give the proper solvent resistance to the final channel sealant composition. It should be understood that the diorganopolysiloxane polymer need not be a single polymer composition but may be a blend of different polymer compositions. It is only important that in the final blend where there may be a single polymer or blends of polymers that the final blend of materials have the viscosity of 50 to 200,000 centipoise at 25°C, and preferably have a viscosity of 1000 to 100,000 centipoise at 25°C.

Such a polymer may have a formula such as,

$$R_n^4 SiO_{(4-n)/2}$$

where $R^4$ is preferably alkyl radicals of 1 to 8 carbon atoms and cyanoalkyl radicals of 2 to 5 carbon atoms where there is present at least 25 mole percent and as high as 50 to 75 mole percent of cyanoalkyl radicals and n varies from 2.001 to 2.05. Such cyanoalkyl radicals must be present in these concentrations if the final channel sealant composition is to have adequate solvent resistance.

Such diorganopolysiloxane polymers of 50 to 200,000 centipoise viscosity at 25°C may be made by hydrolyzing diorganodichlorosilanes with the organo groups which are selected from hydrogen and the other groups as defined above. The chlorosilanes that are hydrolyzed in water produce a mixture of cyclic-polysiloxanes and low molecular weight linear diorganopolysiloxanes. The low molecular weight diorganopolysiloxanes are normally of a viscosity of 100 centipoise at 25°C. These low molecular weight diorganopolysiloxanes with the hydrogen substituents may then be taken and separated out and reacted in an SiH-olefin addition reaction in the presence of a platinum catalyst with organic olefinic cyano compounds in the presence of a platinum catalyst or other suitable catalysts.

If it is desired to produce higher molecular weight material, that is, above 100 centipoise viscosity, of the diorganopolysiloxane polymer, then the hydrolyzate containing cyclicpolysiloxanes which must have at least 25 mole percent hydrogen substituents may then be reacted with a catalyst such as, potassium hydroxide, cesium hydroxide, sodium hydroxide and etc., and the resulting mixture heated at elevated temperatures above 100°C. When the material is so heated there is distilled a mixture of pure cyclicpolysiloxanes and preferably there is distilled off a mixture of pure tetracyclicpolysiloxanes. Such tetracyclicpolysiloxanes are placed in a reaction vessel and there is added to them sufficient amounts of chain-stoppers such as, hexamethyldisiloxane, etc., where the alkyl group is from 1 to 8 carbon atoms, trisiloxanes and etc. such that the final diorganopolysiloxane polymer will have the desired viscosity. To these tetracyclicpolysiloxanes and chain-stoppers there is then added catalytic quantities of again cesium hydroxide, potassium hydroxide or any alkali metal hydroxide in quantities of 50 parts per million to 400 parts per million and the resulting mixture is heated at elevated temperatures of between 100° to 200°C until equilibration is reached. The resulting volatiles may then be distilled off to leave behind the desired linear diorganopolysiloxane polymer having a viscosity of anywhere from 100,000 to 200,000 centipoise viscosity at 25°C, containing at least 25 mole percent hydrogen substituent groups. By this procedure, there can be produced very high molecular weight diorganopolysiloxanes.

If low molecular weight material is desired, that is, below 100,000 centipoise viscosity at 25°C, then the catalyst at the concentration set forth above is preferably a mild acid such as, toluene sulfonic acid or acid activated or treated clay catalysts such as, the sulfuric acid and the hydrochloric acid montomillionite treated clays. One such catalyst is, for instance, the Filtrol type of acid activated clay catalyst manufactured by Filtrol Corporation of Los Angeles, Cal. By using such a catalyst in the same procedure as outlined above, there may be obtained a linear diorganopolysiloxane having at least 25 mole percent of hydrogen groups, the rest of the substituent groups being selected from alkyl radicals and the other organic groups set forth above in the original definition of the substituent groups on the diorganopolysiloxane polymer. By such a procedure, there is obtained a polymer having a viscosity of anywhere from 1,000 to 100,000 centipoise viscosity at 25°C.

The resulting hydrogen substituted diorganopolysiloxane polymer may then be reacted with an olefinic containing cyano organic compound in the presence of a suitable catalyst. Preferably, the cyano compound is an alkenyl cyano organic compound where the alkenyl group is from 2 to 5 carbon atoms. The catalyst that may be used in such a reaction is preferably the Bluestein catalyst as disclosed in U.S. Pat. No. 2,971,970. Other suitable catalysts may also be used for this SiH-olefin addition reaction as is well known in the art.

To 100 parts of the linear diorganopolysiloxane polymer there is added generally 10 to 150 parts by weight of a powdered polytetrafluoroethylene. More preferably the concentration of the powdered polytetrafluoroethylene is anywhere from 40 to 120 parts.

The finely divided polytetrafluoroethylene employed in the practice of the present invention is a material well known in the art and is readily available under the tradename Teflon from E.I. duPont de Nemours & Company of Wilmington, Delaware; under the tradename Rilube No. 63 from the Modern Industrial Plastics Division of the Duriron Company, Dayton, Ohio; and under the tradename TL-126 from the Liquid Nitrogen Processing Corporation, Malvern, Pa. It is desirable that the polytetrafluoroethylene be employed as a fine powder, for example, as a powder of particles having an average particle size of from about 1 to 50 microns, but including some particles having diameters as low as 0.1 to as high as 100 microns or more in diameter.

The powdered polytetrafluoroethylene gives high consistency to the final channel sealant composition and prevents it from flowing under low pressures, that is, pressures of less than 100 psi. After this composition, per 100 parts of the linear diorganopolysiloxane polymer there is preferably added 4 to 25 parts of an untreated silica. The silica is preferably any of the well known untreated silicas such as, silica aerogel, fumed silica and precipitated silica wherein the silica has a surface area of anywhere from 1 to 500 square meters per gram and has a silanol content of less than 1 percent. To the mixture for the basic channel sealant there is also preferably incorporated per 100 parts of the linear diorganopolysiloxane, 4 to 25 parts and preferably 10 to 20 parts of a treated silica. This silica must have the same properties as disclosed for the untreated silica. However, prior to incorporation into the composition, it is preferably treated with an agent so as to give it moisture resistance, which the untreated silica does not have. Such silica is preferably treated with cyclicpolysiloxanes as is disclosed in the Lucas patent, U.S. Pat. No. 2,938,009, whose disclosure is hereby incorporated into the present case by reference.

The finely divided silica fillers employed in the compositions of the present invention are well known in the art. In general, these silicas are sufficiently fine so as to have a relatively high surface area per unit volume. In general, these finely divided silicas have a surface of at least 1 square meter per gram. Most preferable silicas are those having a surface area of between about 4 and 400 or more square meters per gram. The preparation of these silicas are described, for example, in "Natural and Synthetic High Polymers," by K. H. Meyer, page 85 (1942), and in Hurd "Chemical Reviews" vol. 22, No. 3, page 403 (1938). The silicas useful for this invention are those having numerous pours or voids therein and include precipitated silica, silica aerogel and fumed silica. All of such silicas are chemically similar, but sometimes differ among themselves in particle size and particle shape and vary in surface area as measured in square meters per gram. Chemically, each of these silicas contains a plurality of silicon-oxygen-silicon linkages which combine the atoms and particles together and all of these silicas contain hydroxyl groups attached to their surfaces through silicon-oxygen linkages. The silica is used in the present composition as a filler to give the channel sealant a grease-like consistency and to impart to the channel sealant added consistency properties such that it does not break down during the passage of time. The combination of the treated and untreated silica in combination with the powdered polytetrafluoroethylene give the composition the consistency of grease while permitting it not to flow under low pressures. The treated silica is utilized to make the channel sealant water resistant. However, by the sole use of treated silica in the composition the water resistance is not sufficient. Accordingly, to enhance the water resistance in the final channel sealant composition there is added per 100 parts of the linear diorganopolysiloxane 0.3 to 2.0 parts and preferably 0.5 to 1.5 parts by weight of a titanate of the formula

as disclosed previously, where R is selected from alkyl radicals and haloalkyl radicals of 2 to 5 carbon atoms. Although other titanate compounds may be utilized in the channel sealant of the present invention, the above titanate compounds are cheaper and work most effectively in the channel sealant composition of the present invention as disclosed above.

The above concentration of the titanate compound is the preferred concentration. It is noted that generally there may be utilized 0.3 to 2.0 parts of the titanate per 100 parts per million of the linear diorganopolysiloxane polymer. The R substituent group of Formula (1) above is preferably an alkyl radical and haloalkyl radical of 2 to 5 carbon atoms. It can be appreciated that R groups can be other monovalent hydrocarbon substituent groups of 1 to 8 carbon atoms such as, alkenyl, cycloalkyl and etc.

While the titanate compound works very effectively to tie up any moisture that the channel sealant may be exposed to so as to improve the water resistance of the channel sealant, this titanate compound as a water resistant additive in the channel sealant by itself has been found to degrade after a period of time. Accordingly, to enhance the activity of the titanate compound in tieing up water, there is utilized per 100 parts of the linear diorganopolysiloxane polymer 0.3 to 2.0 parts and preferably 0.5 to 1.5 parts by weight of a water resistant organic compound containing at least one hydroxy group. Generally, any aliphatic compound containing one hydroxy group can be utilized as a stabilizing additive for the channel sealant in the present invention. Preferably, this stabilizing additive for the titanium compound of Formula I, above, is an aliphatic diol or triol of 5 to 12 carbon atoms. Such organic compounds are well known in the art and are readily sold on the market. Most preferably, such an organic compound is, for instance, 2-ethyl-1, 3- hexanediol sold by Union Carbide Chemical Co., New York, N.Y. The titanium compounds are also well known in the art and readily sold by E.I. duPont DeNemours & Co., Del., and most preferably the titanium compound of the present composition is tetraisopropyl titanate.

It must be specified that in the present invention the titanate compound must be utilized in combination with the organic compound containing one hydroxy group. The two compounds by themselves increase the moisture resistance of the channel sealant. But these two compounds in combination with the treated and untreated silica and in the concentrations set forth above result in a final channel sealant composition having greatly improved moisture resistance as well as solvent resistance.

Finally, in the broadest form of the present invention there is utilized in the channel sealant composition of the present case, per 100 parts of the linear diorganopolysiloxane, from 10 to 50 parts by weight of styrene beads. More preferably, there is utilized 15 to 40 parts by weight of styrene beads. Although any type of beads may be utilized, it has been found that styrene beads and specifically styrene beads that are inert in the composition can be mixed into the composition easily. The styrene beads also have the property that while imparting to the channel sealant the ability to resist flowing sideways in the channel, they also do not react with the materials in the composition so as to degrade the composition. Generally, any type or size from 1 to 500 mesh of beads can be utilized in the composition. Most preferably, there is utilized in the present composition by weight of total beads, 10 to 40% by weight of beads having a mesh size of 1 to 50; 10 to 40% by weight of beads having a mesh size of 50 to 100; and 10 to 20% by weight of said total beads having a mesh size of 100 to 500. This distribution and size of beads allows the beads when incorporated into the composition to give it a blocking effect as to sideways flow through openings in the channel.

The above is the basic composition of the present case. However, there are other necessary ingredients that could be added to it to improve its properties. For instance, for high temperature resistance of the final channel sealant composition which has a resistance to degradation of temperatures above 300°F and above, there may be added to the composition from 0.5 to 10 parts and preferably from 1 to 8 parts by weight based on 100 parts of the linear diorganopolysiloxane polymer of boron compounds selected from the class consisting of boric acid, trimethoxy boroxine and trialkyl borox where the alkyl groups contain from 1 to 5 carbon atoms. These boron compounds are described and claimed in U.S. Pat. No. 3,103,491. These boron compounds are members selected from the class consisting of boric acid, trimethoxyboroxine and trialkylborates in which the alkyl radicals contain from 1 to 5 carbon atoms. These boron compounds are added in an amount sufficient to provide from 0.001 part by weight to 1.0 part by weight boron per 100 parts by weight of the silicone fluid.

Optionally, in addition to the high temperature boron compounds there may be added to the composition an alkyl silicate, generally, 0.1 to 5 parts and preferably at 0.5 to 2 parts of an alkyl silicate of the formula

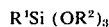

where $R^1$ is selected from the class consisting of alkyl and alkoxy radicals of 1 to 8 carbon atoms and $R^2$ is selected from the class consisting of alkyl, aryl, haloalkyl and alkenyl radicals of 1 to 8 carbon atoms. Such a silicate which is preferably orthoethylsilicate is a well known additive as a cross-linking agent for two-part room temperature vulcanizable silicone rubber compositions. The function of this alkyl silicate in the channel sealant composition of the present case is to work as an added cross-linking agent in the same manner as the titanate of Formula (I), so as to improve the moisture resistance of the final channel sealant composition. Such silicates are well known in the silicone art, and are manufactured by almost every silicone manufacturer.

An additional ingredient that may be utilized in the present channel sealant composition to enhance the consistency of the composition, that is, its ability not to flow at low temperatures, is to add per 100 parts of the linear diorganopolysiloxane polymer of from 5 to 40 parts by weight of a diorganopolysiloxane polymer gum or a blend of polymer gums having a viscosity of 1,000,000 to 200,000,000 centipoise viscosity at 25°C. The organo groups of such a linear diorganopolysiloxane polymer may be selected from alkyl radicals of 1 to 5 carbon atoms and cyanoalkyl radicals of 2 to 5 carbon atoms. Accordingly, a blend of gums are utilized at a concentration of 10 to 30 parts based on 100 parts of basic linear diorganopolysiloxane polymer. A blend of gums can be used and the only requirement is that the final polymer gum blend have a viscosity in the range of 1,000,000 to 200,000,000 centipoise at 25°C. Such linear diorganopolysiloxane gums are well known in the art and the synthesis can be accomplished by the means as specified above for linear diorganopolysiloxane polymer and blends of polymers which is the basic material of the present composition which has a viscosity that varies between 50 to 200,000 centipoise viscosity at 25°C.

The important aspect of the present invention is that it must be vinyl-terminated and more preferably vinyldimethyl-terminated. Accordingly, to produce such polymers the chain-stopper technique used in the synthesis must be dimethylvinyl-terminated chain stoppers such as, tetramethyl and divinyldisiloxane. These linear diorganopolysiloxane gums must have some cyanoalkyl-substituent groups of 2 to 5 carbon atoms, the rest of the substituent groups being preferably alkyl radicals of 1 to 5 carbon atoms. Such concentration of cyanoalkyl groups in the polymer are needed to maintain the solvent resistance of the final channel sealant composition. Preferably, this gum is utilized in the composition per 100 parts of the linear diorganopolysiloxane polymer at a concentration of 10 to 30 parts. Along with such linear diorganopolysiloxane gum or blends of gum having a viscosity of 1,000,000 to 200,000,000 centipoise at 25°C there must be used from 100 to 10,000 parts per million of a peroxide. The peroxide that may be utilized in the channel sealant of the present composition is dicumyl peroxide. The function of this peroxide when incorporated into the composition along with the gum is to permit the gum to partially cross-link due to the vinyl groups in the gum so as to extend the life of the channel sealant in terms of its consistency for much longer periods than was possible before.

Another stabilizing additive that may be utilized in the present composition, that is, an optional stabilizing additive, is a polyether stabilizer which may be utilized generally at a concentration of 0.1 to 2 parts and preferably 0.5 to 1.5 parts based on 100 parts of the linear diorganopolysiloxane of 50 to 200,000 centipoise viscosity at 25°C, which polyether has the formula,

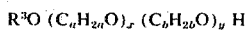

where $R^3$ in the above formula is a member selected from the class consisting of hydrogen, lower alkyl radicals of 1 to 7 carbon atoms, $a$ and $b$ are integers equal to from 1 to 4, inclusive, $x$ is an integer equal to from about 4 to 15, inclusive, and $y$ is an integer equal to from 0 to 50, inclusive.

These useful classes of stabilizers are the polyalkylene glycols and the monoalkyl ethers of such polyalkylene glycols. These compounds can be prepared, for example, by forming polyalkylene glycols of ethylene glycol, propylene glycol, or butylene glycol. These polyalkylene glycols are in turn reacted with a monohydric saturated aliphatic alcohol containing from 1 to 7 carbon atoms to form the monoether. A composition containing two different alkylene oxide groups can be prepared, for example, by reacting a polypropylene glycol with ethylene oxide in the presence of boron trifluoride. The mixed polyalkylene glycol, if desired, can then be reacted with an alkaneol, such as butanol, to form the monobutoxyether of the mixed polyalkylene glycol. A number of these polyalkylene oxide materials are commercially available, including the materials sold under the tradename "Ucon" by Union Carbide Corporation and the material sold under the name "Pluracol" by the Wyandotte Chemicals Corporation.

It has been found, as stated above, that this polyether additive improves the tendency of the channel sealant composition to be resistant to a break down over a period of time and especially it adds to the working life of the channel sealant since the channel sealant does not have to be frequently reinjected into the channel.

Finally, in the final channel sealant composition to 100 parts of the linear diorganopolysiloxane base polymer there may be used a corrosion resistant additive and more desirably an aluminum corrosion additive so as to impart the property to the final channel sealant composition to resist corroding the metal channel in which it is inserted. Generally, there is utilized from 0.1 to 8 parts and more preferably 1 to 5 parts by weight per 100 parts of the linear diorganopolysiloxane polymer of a corrosion resistant additive selected from the class consisting of iron oxide and zinc salts of $C_2O_2$, $C_2O_4$, $C_2O_6$, $C_2O_3$ and $C_2O_7$. It has been found that other metal salts of chromium are not as effective corrosion resistant additives and more specifically corrosion resistant additives as are the above zinc salts.

The ingredients specified above, including both the necessary and optional ingredients of the novel channel sealant of the present case, may be mixed in various ways, however, the difficulty with the various mixing procedures is that they do not optimize the final properties of the channel sealant composition.

Accordingly, in the preferred and optimum process for forming the channel sealant of the present composition, there is mixed with the linear diorganopolysiloxane polymer of 50 to 200,000 centipoise at 25°C, the polytetrafluoroethylene, the treated silica, the titanate and the compound containing at least one hydroxy group. These compounds are preferably mixed in a doughmixer. After this mixing procedure has been completed, then the resulting mixture is heated from 100° to 200°C for 1 hour to 10 hour under a nitrogen atmosphere while continuing the agitation. The purpose of this nitrogen atmosphere and the heating is to remove volatiles from the composition by heating it under inert atmosphere so as to prevent (1) side reactions which would degrade the composition, and (2) so as to remove volatiles such that the channel sealant composition will not degrade after it has been inserted in the channel.

Subsequently, after the agitation and heating under a nitrogen atmosphere the mixture is cooled to room temperature and there is mixed into the composition at room temperature the styrene beads.

The most preferred method of mixing all the ingredients in the composition is as follows. There is placed in the doughmixer with constant agitation, first, the linear diorganopolysiloxane polymer of 50 to 200,000 centipoise viscosity at 25°C; then there is mixed into it the titanate compound and then the hexame diol and then the boron compound. At this point, there is added to the doughmixer the untreated silica and then after that the treated silica. Because the powdered teflon unduly increases the viscosity initially in the doughmixer, there is added at this point a powdered tetrafluoroethylene and subsequent after it has been mixed in the composition there is added the linear diorganopolysiloxane gum of 1,000,000 to 200,000,000 centipoise viscosity at 25°C. Then the silicate is added to the mixture and the resulting composition is mixed until it is homogeneous wherein the total mixing time which is continuous during the mixing of the ingredients may take anywhere from 1 to 10 hours. This initial mixing in the doughmixer takes place at room temperature. At the end of the mixing of these ingredients and with continuous agitation, the contents in the doughmixer are heated to a temperature between 100° to 200°C and preferably at a temperature between 150° to 200°C for a period of time of anywhere from 1 to 10 hours under nitrogen atmosphere. The purpose of this mixing under nitrogenn atmosphere is to devolatilize the composition and remove volatile material from the channel sealant. If the volatiles are not removed during normal operation of the compartment, the volatiles would escape and degrade the composition. Accordingly, the heating under nitrogen atmosphere is necessary to prepare a stable channel sealant composition with a long life. After the heating under nitrogen atmosphere, the composition is cooled to room temperature and there is added again in the doughmixer to the composition first, the peroxide catalyst, then the beads and preferably the different size beads are mixed before inserted or added to the doubhmixer. Then there is added the polyether and finally there is added the corrosion resistant additive, that is, the iron oxide or zinc chromium compound. These added ingredients are mixed into the prior mixed composition at room temperature for a period of time of anywhere from 30 minutes to 4 hours and at the end of that period, the final composition has been prepared. The resulting composition is then ready to be packaged and shipped in appropriate containers and injected into a channel and has a shelf life of anywhere from 6 months to 2 years or more.

As has been stated, the above mixing or process for mixing for forming the channel sealant composition of the present invention is one that optimizes and enhances the desired properties of the channel sealant composition of the present case.

The following examples are given for the purpose of illustrating the present invention and are not intended to describe or define the limits of the present invention as claimed in the present case.

EXAMPLE 1

There is added first in a doughmixer which is continually agitating at room temperature, 30 parts of cyanoethyl methyl polysiloxane trimethylsiloxy chain-stopped of 70,000 centipoise viscosity at 25°C, 0.3 parts of tetraisopropyltitanate, 0.3 parts of 2,ethyl-1,3-hexane diol, 0.4 parts of alkyl borate, 3.9 parts of untreated fumed silica, and 3.9 parts of octamethyltetracyclicsiloxane treated fumed silica, 40.1 parts of powdered teflon, 6.4 parts of 25 mole percent cyanoethyl, 75 mole percent dimethylpolysiloxane polymer which is end-stopped with vinyldimethylsiloxy groups and has a viscosity of 1,000,000 centipoise viscosity at 25°C. The resulting mixture was thoroughly mixed for about 4 hours and was heated to 150° for 3 hours under nitrogen atmosphere with continuous mixing. At the end of that period, the material was cooled to room temperature and there was added to it 100 parts per million of perbenzoate peroxide, 5.9 parts of 16–50 mesh styrene beads, 5.9 parts of 50–100 mesh styrene beads, and 2.0 parts of 200–400 mesh styrene beads. With continuous agitation, there was then added to the mixture 21 parts of polyethylene butylene oxide polyether and 1.0 parts of zinc chromate for a total mixing time of 5 hours. The channel sealant was ready to be utilized. This compound had an extrusion value of 125–200 pounds, a penetration value of 100–175, a solvent swell value of 15–20 percent and solubility in jet fuel of 3–5 percent. In the common channels of fuel tanks of jet airplanes, this compound had an injection time of one-tenth of the value obtained for other beaded sealants and one-third of the time that it took for other non-beaded sealants. The seal efficiency test indicated that this compound sealed as efficiently as any other compound presently on the market. Such seal efficiency test is identified by the Department of the Navy as MIL-S-81323A(AS). Reinjection into channels with the compound of this example could be carried out at pressures such as, 2800 psi and at times of 10–15 seconds which reinjection pressures and times were less than any other sealant.

Under a number of tests, it was indicated that the channel sealant of this example had significant sideway flow reduction in channels with depths up to 20 mils at pressures less than 100 psi, where other sealants that were tested that are present on the market would not flow in the channel or if they flowed in the channel would also flow out through the gaps in the channel. The present sealant of this example does flow in the channel but had a marked reduced tendency not to flow sideways out of the channel even when there were gaps up to 20 mils in such channels and even when there were pressures in the channels of up to 100 psi.

I claim:

1. A silicone channel sealant comprising 100 parts by weight of a diorganopolysiloxane of 50 to 200,000 centipoise viscosity at 25°C, where the organo groups are selected from monovalent hydrocarbon radicals and cyanoalkyl, 10 to 150 parts by weight of powdered polytetrafluoroethylene, 4 to 25 parts by weight of untreated silica, 4 to 25 parts of a treated silica, 0.3 to 2.0 parts by weight of a titanate of the formula, $$(RO)_4 Ti$$

where R is selected from alkyl radicals and haloalkyl radicals of 2 to 5 carbon atoms, from 0.3 to 2.0 parts by weight of an aliphatic hydrocarbon compound containing at least one hydroxy group and from 10 to 50 parts by weight of styrene beads.

2. The channel sealant of claim 1 wherein there is present from 0.5 to 10 parts by weight of a high temperature stabilizing boron additive selected from the class consisting of boric acid, trimethoxy boroxime and trialkyl borates where the alkyl group contains from 1 to 5 carbon atoms.

3. The channel sealant of claim 2 wherein there is present from 0.1 to 5 parts by weight of a stabilizing additive which is an alkyl silicate of the formula, $$R^1Si(OR^2)_3$$

where $R^1$ is selected from the class consisting of alkyl and alkoxy radicals of 1 to 8 carbon atoms and $R^2$ is selected from the class consisting of alkyl, aryl, haloalkyl and alkenyl radicals of 1 to 8 carbon atoms.

4. The channel sealant of claim 3 where there is present from 5 to 40 parts by weight of a diorganopolysiloxane having a viscosity of 1,000,000 to 200,000,000 centipoise at 25°C, where the organo groups are selected from alkyl of 1 to 5 carbon atoms and cyanoalkyl of 2 to 5 carbon atoms wherein the polymer is dimethylvinyl end-stopped.

5. The channel sealant of claim 4 wherein there is present from 100 to 10,000 parts per million of a peroxide.

6. The channel sealant of claim 5 wherein there is present a polyether stabilizer at a concentration of 0.1 to 2 parts by weight of the formula, $$R^3 O (C_aH_{2a}O)_x (C_bH_{2b}O)_y H$$

where $R^3$ is a member selected from the class consisting of hydrogen, and lower alkyl radicals of 1 to 7 carbon atoms, $a$ and $b$ are integers equal to from 1 to 4, inclusive, $x$ is an integer equal to from about 4 to 50, inclusive, and $y$ is an integer equal to from 0 to 50 inclusive.

7. The channel sealant of claim 6 wherein there is present from 0.1 to 8 parts by weight of a corrosion resistant additive selected from the class consisting of iron oxide and zinc salts of $C_2O_2$, $C_2O_4$, $C_2O_6$, $C_2O_3$, and $C_2O_7$.

8. The channel sealant of claim 1 wherein the diorganopolysiloxane can be blends of diorganopolysiloxanes and that the final blend of 50 to 200,000 centipoise viscosity in the polymer have the formula, $$R_n^4 SiO_{(4-n)/2}$$

where $R^4$ is selected from the class consisting of methyl and cyanoethyl, and $n$ varies from 2.001 to 2.05.

9. The channel sealant of claim 1 wherein the silica filler is selected from silica aerogel, fumed silica and precipitated silica and the treated silica is treated prior to incorporation in the composition with cyclicpolysiloxanes of the formula, $$(R^5 SiO)_z$$

where $R^5$ is an alkyl radical of 1 to 8 carbon atoms and $z$ varies from 3 to 10.

10. The channel sealant of claim 1 wherein the aliphatic hydrocarbon compound containing at least one hydroxy group is selected from the class consisting of aliphatic diols and triols of 5 to 12 carbon atoms.

11. The channel sealant of claim 1 wherein the styrene beads are styrene beads where 10 to 40% by weight of said total beads have a mesh size of 1 to 50, 10 to 40% by weight of said total beads have a mesh size of 50 to 100 and 10 to 20% by weight of said total beads have a mesh size of 100 to 500.

12. The channel sealant of claim 5 where the peroxide is dicumyl peroxide.

13. The channel sealant of claim 10 wherein the titanate compound is tetraisopropyl titanate and the aliphatic hydrocarbon compound containing at least one hydroxy group is 2-ethyl,1,3-hexanediol.

14. A process for forming a channel sealant comprising (a) mixing 100 parts by weight of a diorganopolysiloxane of 50 to 200,000 centipoise viscosity at 25°C, where the organo groups are selected from monovalent hydrocarbon radicals and cyanoalkyl, 10 to 150 parts by weight of powdered polytetrafluoroethylene, 4 to 25 parts by weight of untreated silica, 0.3 to 2.0 parts by weight of a titanate of the formula, $$(RO)_4 Ti$$

where R is selected from alkyl radicals and haloalkyl radicals of 2 to 5 carbon atoms and an aliphatic hydrocarbon compound containing at least one hydroxy group, (b) heating the resulting mixture to 100° to 200°C from 1 to 10 hours under a nitrogen atmosphere while continuing the agitation of the mixture, (c) cooling the mixture to room temperature, and (d) mixing into resulting composition from 10 to 50 parts by weight of styrene beads.

15. The process of claim 14 wherein prior to step (b) there is added from 0.5 to 10 parts by weight of a high temperature stabilizing boron additive selected from the class consisting of boric acid, trimethoxy boroxime and trialkyl borate where the alkyl groups contain from 1 to 5 carbon atoms.

16. The process of claim 15 wherein in step (b) there is mixed into the other ingredients from 0.1 to 5 parts by weight of a stabilizing additive which is alkyl silicate of the formula, $$R^1 Si (OR^2)_3$$

where $R^1$ is selected from the class consisting of alkyl and alkoxy radicals of 1 to 8 carbon atoms and $R^2$ is selected from the class consisting of alkyl, aryl, haloalkyl, and alkenyl radicals of 1 to 8 carbon atoms.

17. The process of claim 16 wherein in step (b) there is added from 5 to 40 parts by weight of a diorganopolysiloxane having a viscosity of 1,000,000 to 200,000,000 centipoise at 25°C, where the organo groups are selected from alkyl of 1 to 5 carbon atoms and cyanoalkyl of 2 to 5 carbon atoms wherein the polymer is dimethylvinyl end-stopped.

18. The process of claim 17 wherein in step (b) there is added from 100 to 10,000 parts per million of a peroxide.

19. The process of claim 18 wherein in step (d) there is added to the ingredients from 0.1 to 2 parts by weight of a polyether stabilizer of the formula, $$R^3 O (C_a H_{2a} O)_x (C_b H_{2b} O)_y H$$

where $R^3$ is a member selected from the class consisting of hydrogen and lower alkyl radicals of 1 to 7 carbon atoms, $a$ and $b$ are integers equal to from 1 to 4, inclusive, $x$ is an integer equal to from about 4 to 50, inclusive, and $y$ is an integer equal to from 0 to 50.

20. The process of claim 19 wherein in step (d) there is added from 0.1 to 5 parts by weight of a corrosion resistant additive selected from the class consisting of iron oxide, and zinc salts of $C_2O_2$, $C_2O_4$, $C_2O_6$, $C_2O_3$, and $C_2O_7$.

21. The process of claim 14 wherein the diorganopolysiloxane can be blends of diorganopolysiloxanes such that the final polymer blend has a viscosity of 50 to 200,000 centipoise at 25°C, and the polymer or polymers have the formula, $$R_n^4 SiO_{(4-n)/2}$$

where $R^4$ is selected from the class consisting of methyl and cyanoethyl, and $n$ varies from 2.001 to 2.05.

22. The process of claim 14 wherein the silica filler is selected from silica aerogel, fumed silica and precipitated silica and the treated silica is treated prior to incorporation in the composition with cyclicpolysiloxanes of the formula, $$(R^5 SiO)_z$$

where $R^5$ is an alkyl radical of 1 to 8 carbon atoms and $z$ varies from 3 to 10.

23. The process of claim 14 wherein the aliphatic hydrocarbon compound containing at least one hydroxy group is selected from the class consisting of aliphatic diols and triols of 5 to 12 carbon atoms.

24. The process of claim 14 wherein the styrene beads are styrene beads where 10 to 40% by weight of said total beads have a mesh size of 1 to 50, 10 to 40% by weight of the total beads have a mesh size of 50 to 100 and 10 to 20% by weight of said total beads have a mesh size of 100 to 500.

25. The process of claim 18 wherein the peroxide is dicumyl peroxide.

26. The process of claim 23 wherein the titanium compound is tetraisopropyl titanate and the aliphatic hydrocarbon compound containing at least one hydroxy group is 2-ethyl, 1,3-hexanediol.

* * * * *